(12) United States Patent
Niemelä

(10) Patent No.: US 8,745,733 B2
(45) Date of Patent: Jun. 3, 2014

(54) WEB CONTENT RATINGS

(75) Inventor: Jarno Niemelä, Espoo (FI)

(73) Assignee: F-Secure Corporation, Helsinki (FI)

( * ) Notice: Subject to any disclaimer, the term of this patent is extended or adjusted under 35 U.S.C. 154(b) by 93 days.

(21) Appl. No.: 12/932,015

(22) Filed: Feb. 16, 2011

(65) Prior Publication Data

US 2012/0210435 A1    Aug. 16, 2012

(51) Int. Cl.
*H04L 29/06* (2006.01)

(52) U.S. Cl.
USPC ............................................. 726/22

(58) Field of Classification Search
None
See application file for complete search history.

(56) References Cited

U.S. PATENT DOCUMENTS

| 6,510,458 | B1* | 1/2003 | Berstis et al. | 709/219 |
| 8,032,923 | B1* | 10/2011 | Li et al. | 726/2 |
| 2002/0120870 | A1* | 8/2002 | Susaki et al. | 713/201 |
| 2005/0021997 | A1* | 1/2005 | Beynon et al. | 713/200 |
| 2008/0133540 | A1* | 6/2008 | Hubbard et al. | 707/10 |
| 2008/0289047 | A1* | 11/2008 | Benea et al. | 726/27 |
| 2009/0249445 | A1* | 10/2009 | Deshpande et al. | 726/3 |

* cited by examiner

*Primary Examiner* — David Pearson
(74) *Attorney, Agent, or Firm* — Harrington & Smith

(57) ABSTRACT

A method of performing a security check at a user computer on web page content downloaded to the user computer over the Internet. The method includes retrieving rating information for the web page from a web service over the Internet, the rating information including one or more content ratings and a first signature generated from the content, using a specified algorithm, at substantially the same time as the or each content rating was determined. The downloaded web page content is then processed using said specified algorithm to generate a second signature, and said first and second signatures are compared and the differences therebetween quantified. It is then determined if the quantified difference exceeds a threshold value. If not, then the received content rating(s) is(are) trusted. If yes, then the result is reported to said web service.

12 Claims, 2 Drawing Sheets

WEB CONTENT RATINGS

TECHNICAL FIELD

The present invention relates to web content ratings and in particular to a method and apparatus for maintaining and updating web content ratings and for determining when such ratings are no longer valid.

BACKGROUND

Whilst the Internet represents a huge source of valuable information, much of the content that is available online is inappropriate or malicious, or indeed illegal. By its very nature, it is not always easy to track and eliminate such content. Law enforcement agencies find it particularly challenging to identify and remove illegal content. Such content may be malicious, for example malware capable of stealing individual's bank details, or pornographic. The best way for organisations and individuals to protect themselves against inappropriate content is to install onto their computers and/or servers security software which filters outgoing content requests and/or downloaded data to remove unsuitable content.

Once such product is the Internet Security product provided by F-Secure® Corporation of Helsinki, Finland. As well as scanning downloaded data for the presence of malware, this product is able to identify potentially unsafe content following a user or client computer initiated request to download content from the Internet. This identification may occur either prior to a web page being downloaded or prior to it being displayed or otherwise processed on the client computer. The approach relies on the maintenance at a central rating server of a website rating database. For each web page, as represented by a Uniform Resource Locator (URL), the database holds a rating indicating the nature of and threat posed by the web page. A rating indicates, for example, whether the content within a web page is suitable for children, is suitable for children but under adult supervision, or is completely inappropriate for children. The rating may also indicate whether the web page is known or likely to contain malware.

Whenever a web browser (or other application capable of accessing content at a website, for example an email client) sends a request to obtain content from a website, or perhaps sends a DNS look-up request to obtain an IP address for a URL, the request is intercepted by a security application (e.g. a browser plugin), and the URL associated with the request is simultaneously sent to the rating server where the rating database is maintained. The rating server obtains the rating information for the web page (URL) in question, and returns this to the security application at the user's computer. The security application buffers any content received from the website associated with the request until such time as the rating has been received from the rating server. Typically this rating is received prior to any significant amount of data being downloaded from the website such that the downloading and displaying of content is not substantially delayed. Once the rating information is obtained from the rating server, depending upon the nature of the rating information, the security application may block (further) downloading of the content or processing (e.g. display) of already downloaded content and provide a warning to the user depending. In some cases, the security application may compare the rating information received against parental control settings maintained on the user's computer for the current user. Downloading and processing of content is only blocked if these settings are such that they restrict access to content of the type identified by the received rating information. Of course, if a rating indicates that content may contain malware such as a computer virus, downloading and processing is blocked regardless of the parental control settings.

The rating-based approach described above works well for websites having relatively static content, or at least content which does not change greatly in terms of its nature over time. However, the dynamic nature of many websites represents a potential problem when attempting to identify and categorise web content. Due to limited resources, the providers of Internet security services are unable to access (e.g. using web spidering techniques) and re-rate websites on a regular basis. Changes in the content available at a particular website can remain undetected for several months or even longer. Consider for example a registered domain main which, when accessed, presents to a user a "parking" web page, that is a web page merely indicating that the domain name is registered. When the website is checked and rated by a security service provider, the web page will be rated as benign and suitable for accessing by children. However, the owner of the domain name may subsequently introduce inappropriate or malicious content onto the web page, and the change in nature of the content will not be reflected in the benign rating given to it by the security service provider. Of course, when a user seeks to download the modified web page, the pre-downloading check performed by the security application installed on the client computer will merely indicate that the nature of the content is benign, such that the content will be downloaded and the user and client computer exposed to the changed and inappropriate content. This is not only dangerous from the point of view of the user, but will also reduce the user's trust in the security service. Furthermore, it will result in an increased level of enquiries being directed to the security service provider, increasing the service provider's maintenance costs.

SUMMARY

It is an object of the present invention to reduce the risk of users and their computers being exposed to inappropriate or malicious web content as a result of only periodic rating checks being carried out on such web content.

According to a first aspect of the present invention there is provided a method of performing a security check at a user computer on web page content downloaded to the user computer over the Internet. The method comprises retrieving rating information for the web page from a web service over the Internet, the rating information including one or more content ratings and a first signature generated from the content, using a specified algorithm, at substantially the same time as the or each content rating was determined. The downloaded web page content is then processed using said specified algorithm to generate a second signature, and said first and second signatures are compared and the differences therebetween quantified. It is then determined if the quantified difference exceeds a threshold value. If not, then the received content rating(s) is(are) trusted. If yes, then the result is reported to said web service.

Embodiments of the invention can substantially reduce the risk of users and their computers being exposed to inappropriate or malicious web content. Prompt reporting of out of date rating information is enabled, allowing a security service provider to quickly re-rate web site content and disseminate up to date information to users.

According to a second aspect of the present invention there is provided a computer configured to perform a security check on web page content downloaded to the computer over the Internet. The computer comprises an interface for retrieving rating information for the web page from a web service over the Internet, the rating information including one or more content ratings and a first signature generated from the content, using a specified algorithm, at substantially the same time as the or each content rating was determined. It further comprises a web page content processor for processing the downloaded web page content using said specified algorithm to generate a second signature, and a comparator for comparing said first and second signatures and for quantifying differences therebetween and for determining if the quantified difference exceeds a threshold value. A web page content handler is provided for handling the content according to the received content rating(s) if the quantified difference does not exceed said threshold value, and for reporting the result of the determination to said web service if the quantified difference does exceed said threshold value.

DETAILED DESCRIPTION

Figure 1:
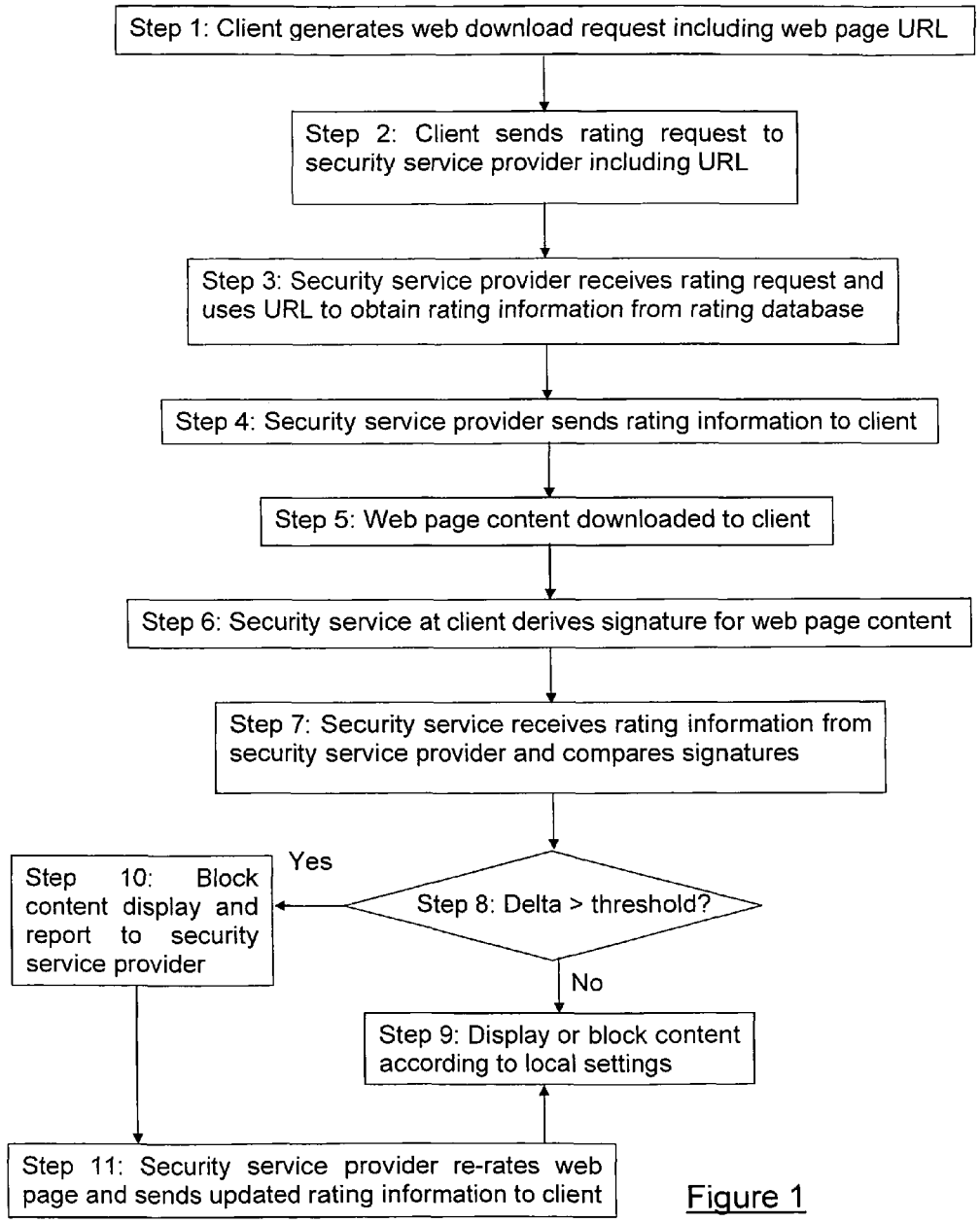
FIG. 1 is a flow diagram illustrating a procedure for checking the validity of a currently available website rating and for updating that rating if necessary.

As has been discussed above, the dynamic nature of the Internet makes it possible for the content at a particular website to change in such a way that previously obtained and currently available rating information for that website is no longer valid. This presents a security risk for both end users and for their computers. It is proposed here to address this problem by including in web page rating information, provided by a security service provider over the Internet to client computers, a signature or otherwise representative fingerprint which is indicative of the content within the web page at the time when the rating information was obtained. This signature is complex in the sense that it conveys representative details of the content of the web page content. Users' computer are provided with a security service which is able to derive a signature for a downloaded web page which can be checked against the signature delivered by the security service provider. If the signatures differ significantly, then it is assumed that the provided rating information is no longer valid and cannot be trusted. This triggers the sending of a report from a user's computer to the security service provider, such that the provider is caused to access and re-rate the web page in question. At the same time, this detected inconsistency between the signatures may cause the security service on the user's computer to block access to the downloaded content or to at least present a warning to the user that the web page rating is out of date.

The signature that is derived for web page content is indicative of "structural" properties of the content, rather than the informational nature of the content. As such, it can be derived automatically, without requiring human input. Whilst the signature which is obtained for a given web page may be purely representative of the digital content of the page, it is preferable instead to derive a signature which is a more intelligent representation of the content, e.g. indicating the number of images present in a web page. This is discussed further below. In addition, the signature includes allowed tolerances such that, only if a change or "delta" in a web page exceeds an allowed tolerance, is it considered to be a change which invalidates the previously obtained rating information. For example, it is likely that a web page at an active web site will gain or lose only a relatively small number of images over time due to reasonable changes in content. However, if a web page contained only five images when rating information was obtained, and the site is suddenly changed to include twenty images, this delta can be taken as indicative that the nature of the content has changed significantly.

The signature should be a relatively compact and easily derived string or sequence of numerical values which contains sufficient information to determine whether or not a web page has changed significantly since the rating information was obtained. To this end, the signature for a given web page may be constructed based upon several or all of the following elements within the page:

Background color.
Number of images (in steps of 0,5,10,15,25, etc for example).
Average size of images.
Standard deviation of image size (are images all roughly same size or are there large differences).
Number of Javascript elements.
Size of Javascript elements.
Obfuscation on Javascript elements (yes, no, how many).
Highest entropy of Javascript elements.
Number of tables.
Number of cells in table.
Standard deviation cell counts in table.
Number of tables containing images in each cell.
Number of Flash elements.
Number of iframe elements.
Size of Flash elements.
Number of Java elements.
Size of Java elements.
Number of links.
Number of different domains linked.
File extensions in links (contains exe links, does not contain exe links).
Presence of words associated with a specific category such as adult, racism or drug related words.

A backend server operated by the provider of a security service is responsible for crawling websites and for obtaining rating information. As previously discussed, for any given web page, this may include both a safety and a content rating. In addition, the backend server derives a signature for each web page that it rates and stores this in a rating database together with the safety and content rating, and using the web page URL as the lookup key. [Alternatively, one or more client computers may derive this signature and provide it to the security service provider for inclusion in the rating database.]

The security service may be implemented on the client computer in a number of different ways. For example, the service may be implemented by way of a modified web browser or a web browser plugin. Another implementation involves inserting executable code into downloaded web page content such that the code is executed when the page is processed by the web browser. The code may be Javascript code which checks the signature over the content and reports to the security service provider if necessary. Yet another implementation involves "hooking" the RCP/IP stack directly and analysing the downloaded content at the point in order to determine the signature.

FIG. 1 is a flow diagram illustrating a process for utilising the rating information maintained at the server(s) of the security service provider. At step 1, the client computer generates a request to download the content of a webpage. The request includes the URL of the webpage in question. The client computer may perform a DNS look-up on this URL in order to obtain the corresponding IP address on obtain the IP address from a local DNS cache. In either case, at the same time as performing the DNS query, the client will send a rating request to the security service provider, step 2. This may be, for example, an http request addressed to an IP address preconfigured for the security service provider. The request includes the URL of the webpage which it is desired to access. Upon receipt of the request, at step 3 the security service provider uses the URL as a look-up key in its rating database, and obtains the corresponding rating information including the previously derived signature. This information is returned to the client computer at step 4. Meanwhile, the client has obtained the IP address for the webpage and has sent a download request to the retrieved IP address. That content is downloaded from the website at step 5.

Upon downloading the webpage content, at step 6 the security service installed on the client computer examines the webpage content and generates a signature according to the preconfigured algorithm. This process preferable happens prior to the webpage content being displayed in the browser window, although this is not essential. The client computer receives the rating information sent to it by the security service provider. At steps 7 and 8, the security service on the client computer compares the signature with the rating information against that signature which it has itself derived. If the signatures are sufficiently similar, where a degree of similarity is included in the rating information, the security service determines that the rating information received from the security service provider is valid and that no further action is required (step 9), except perhaps to unblock display of the downloaded content if that display was previously blocked. However, if the comparison of the signatures determines that the signatures are not sufficiently similar, then the security service blocks display of the content if that is still possible (step 10). In addition, or alternatively, the security service may provide a warning to the user e.g. in the browser window or by way of a pop-up window, that the rating is no longer valid and that it cannot be trusted.

The security service reports back to the security service provider (step 10) that it has identified a web page for which the centrally obtained signature is not consistent with the locally obtained signature. This causes the security service provider to trigger a re-rating procedure for the web page at step 11. The security service provider may carry out this process immediately, or it may be queued pending processing of earlier received requests. In either case, the re-rating process is carried out relatively quickly in order to reduce the risks of users being exposed to unsuitable or malicious content. If the rating can be carried out very quickly, for example within a few seconds or less, the security service provider may return a response to the client computer from which the alert originated, with the response including the updated rating information. If this rating information indicates that the content is suitable for the user and is not malicious, the security service on the local client computer may unblock display of the content if the display was previously blocked (step 9). Of course, if the new rating information indicates that the content at the web page is unsuitable or malicious, then the security service on the client computer will act appropriately.

An alternative approach to handling an inconsistent signature is for the client computer to stream the downloaded content back to the security service provider, where it is analysed and re-rated. Alternatively, re-rating may be performed at the client using algorithms specifically designed for this purpose.

Whilst it has been noted above that only if the signatures are sufficiently different is access to the content blocked and/or the security service provider notified, it is also possible that less significant differences are notified to the security service provider whilst at the same time accessed to the content at the client computer is not restricted. In this case, the security service provider takes the alert as an indication that the website content should be re-rated, although this would not be done with any high priority. The re-rating process is merely placed ahead of other periodically scheduled rating processes. Additionally, the security service provider may update the signature included in the rating information stored in the rating database for the web site in question with the new signature, allowing the service to adapt to gradual, and expected changes in web site content. Updates may be based on an aggregate of reports from multiple client computes to reduce the risk of fraud.

Figure 2:
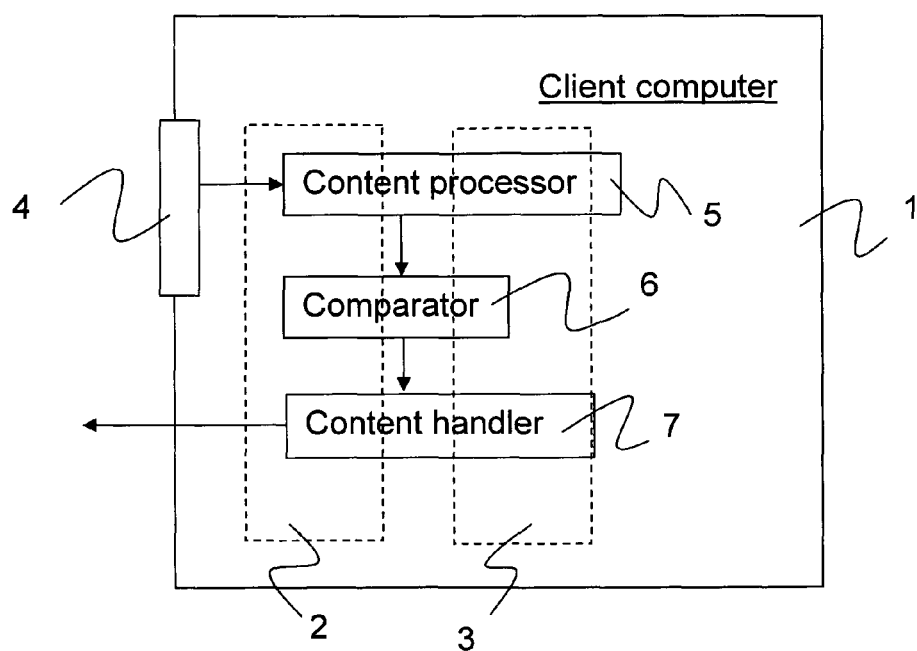
FIG. 2 illustrates schematically a client computer configured to check the validity of a currently available website rating.

FIG. 2 illustrates schematically a client/user computer 1 configured to implement the process described above. The computer comprises a memory 2 for storing computer program code and data, and various other hardware components 3 for implementing the program code, handling data, etc. The computer 1 is provided with the following functional components:

An interface 4: This is configured to retrieve rating information for the web page from a web service over the Internet. The rating information includes one or more content ratings and a first signature generated from the content, using a specified algorithm, at substantially the same time as the or each content rating was determined.

A web page content processor 5: This processor is configured to process the downloaded web page content using the specified algorithm to generate a second signature.

A comparator 6: The comparator compares the first and second signatures and quantifies differences therebetween and determines if the quantified difference exceeds a threshold value.

A web page content handler 7: This entity handles the content according to the received content rating(s) if the quantified difference does not exceed said threshold value, and reports the result of the determination to the web service if the quantified difference does exceed the threshold value.

It will be appreciated by the person skilled in the art that various modifications may be made to the above described embodiments without departing from the scope of the invention.

The invention claimed is:

1. A method of performing a security check at a user computer on web page content downloaded to the user computer over the Internet, the method comprising:

retrieving rating information for the web page from a web service over the Internet, the rating information including one or more content ratings and a first signature generated from the content, using a specified algorithm, at substantially the same time as the one or more content ratings were determined;

processing the downloaded web page content using said specified algorithm to generate a second signature;

comparing said first and second signatures and quantifying differences therebetween;

determining if the quantified difference exceeds a threshold value and, if not, then trusting the received content rating(s) and, if yes, then reporting the result to said web service;

responsive to receipt of a reported result at the web service, generating updated rating information for the web page and sending the updated rating information to the user computer; and receiving updated rating information at the user computer and handling the web page content in accordance with the content ratings contained in the updated rating information.

2. A method according to claim 1 and comprising, if the quantified difference exceeds said threshold value, blocking display of the web page content on the user computer.

3. A method according to claim 1, wherein said specified algorithm determines one or more of the following properties of the web page content:
Background color;
Number of images;
Average size of images;
Standard deviation of image size;
Number of interpreted computer programming language elements;
Size of interpreted computer programming language elements;
Obfuscation on interpreted computer programming language elements;
Highest entropy of interpreted computer programming language elements;
Number of tables;
Number of cells in table;
Standard deviation cell counts in table;
Number of tables containing images in each cell;
Number of Flash elements;
Number of iframe elements;
Size of Flash elements;
Number of object-oriented computer programming language elements;
Size of object-oriented computer programming language elements;
Number of links;
Number of different domains linked;
File extensions in links;
Presence of words associated with a specific category and includes within said second signature indications of the property or properties.

4. A method according to claim 1, wherein said step of retrieving rating information for the web page from a web service over the Internet comprises:
detecting at the user computer the generation or sending of a request to download said web page content;
upon such detection, sending a request to said web service including a Uniform Resource Locator, URL, of the web page; and
receiving from the web service said rating information.

5. A method according to claim 1 and comprising generating said second signature by applying said specific algorithm to code making up a part of the web page content.

6. A method according to claim 5, wherein said code is html code.

7. A method according to claim 1, wherein said threshold value is contained within the retrieved rating information.

8. A method according to claim 1, wherein the first and second signatures are either data files or binary strings.

9. A method according to claim 1, the method being carried out by a web browser plugin installed on the client computer.

10. A method according to claim 1, the method being carried out at least in part by adding executable code into the downloaded web page content, and executing the code using a web browser or web browser plugin.

11. A method according to claim 10, wherein the executable code added into the downloadable web page content is interpreted computer programming language code.

12. A computer configured to perform a security check on web page content downloaded to the computer over the Internet, the computer comprising:
memory;
an interface for retrieving rating information for the web page from a web service over the Internet, the rating information including one or more content ratings and a first signature generated from the content, using a specified algorithm, at substantially the same time as the one or more content ratings were determined;
a web page content processor for processing the downloaded web page content using said specified algorithm to generate a second signature;
a comparator for comparing said first and second signatures and for quantifying differences therebetween and for determining if the quantified difference exceeds a threshold value; and
a web page content handler for handling the content according to the received content rating(s) if the quantified difference does not exceed said threshold value, and for reporting the result of the determination to said web service if the quantified difference does exceed said threshold value; and
responsive to the reporting of a result to the web service, receiving updated rating information at the user computer from the web service and handling the web page content in accordance with the content ratings contained in the updated rating information.

* * * * *